Nov. 16, 1948.   G. H. DUVALL, JR   2,453,746
WHEEL AND TIRE LOCKING DEVICE
Filed March 30, 1945   4 Sheets-Sheet 3

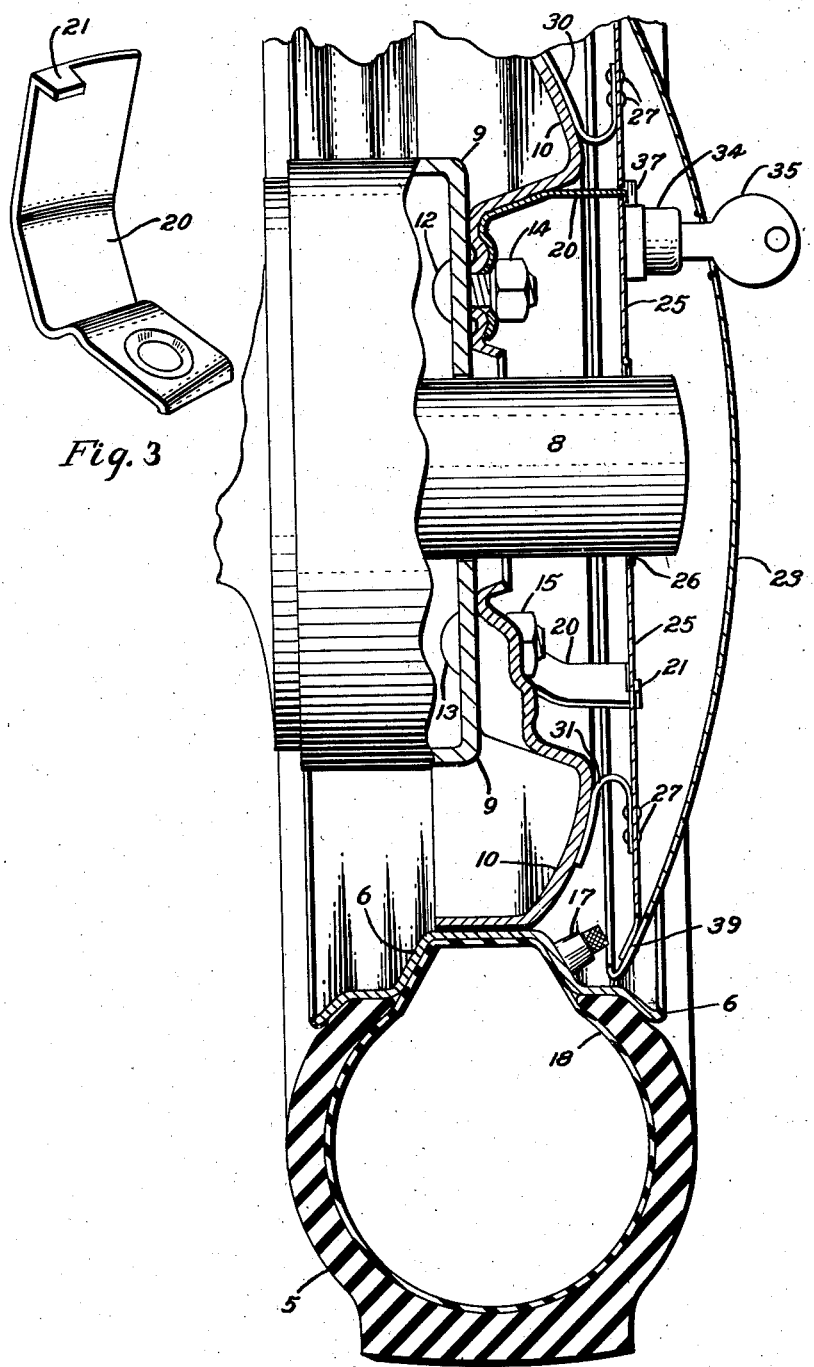

INVENTOR.
George H. Duvall Jr.
BY
ATTORNEY

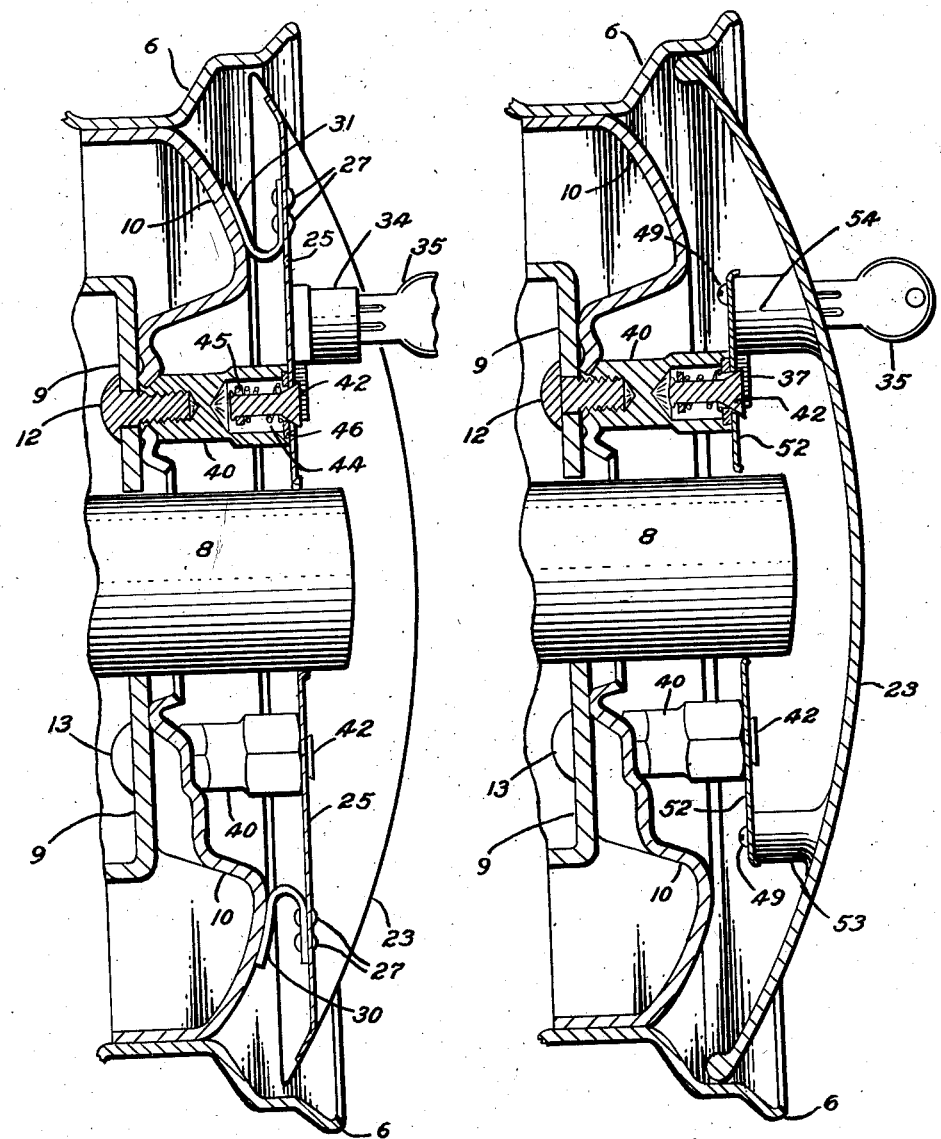

Patented Nov. 16, 1948

2,453,746

UNITED STATES PATENT OFFICE 2,453,746

WHEEL AND TIRE LOCKING DEVICE

George H. Duvall, Jr., Los Angeles, Calif.

Application March 30, 1945, Serial No. 585,779

11 Claims. (Cl. 70—259)

This invention relates to anti-theft devices, and particularly to such devices to prevent the unauthorized removal of automobile wheels and tires.

Devices for preventing the theft of automobile wheels, particularly the spare wheel, are well-known, these devices employing disc attachments to the wheel bolts or hub with suitable locks for preventing access to the wheel bolts. It frequently occurs, however, that in spite of such locking devices, tires are stolen from automobile wheels by simply deflating the tire and removing it from the rim. The present invention is directed to a locking device which not only prevents the unauthorized removal of the wheel, but also prevents deflation of the tire so that its removal from the wheel or tire rim is prevented. It is particularly applicable to the wheels and tires in use, as well as the spare wheel and tire.

In many of the prior devices, the attachments are so arranged as to permit them to rattle during the running of the automobile. The present invention places the attachment under tension at all times to eliminate any separation between the locking disc and the wheel, and thus prevents the creation of noise. The locking device prevents access to the air valve, but since it is necessary that the tires be checked and inflated from time to time, the invention permits such checking and the attachment of an air hose to the air valve for inflation of the tire without the complete removal of the locking device. This feature, therefore, simplifies the anti-theft device, since it may be adjusted quickly in a simple manner to permit the inflation of the tire. This adjustment is accomplished without removing the tension between the device and the wheel. The device is in the form of a disc which not only functions as an anti-theft device for both the wheel and the tire, but also as a decoration for the wheel.

The principal object of the invention, therefore, is to prevent the theft of vehicle wheels and pneumatic tires.

Another object of the invention is to provide an improved wheel and tire locking device for running and spare automobile wheels.

A further object of the invention is to provide a decorative hubcap for an automobile wheel which serves as an anti-theft device for both the wheel and tire.

A still further object of the invention is to provide a disc locking device for an automobile wheel and tire and which prevents unauthorized access to the air valve, but which may be adjusted to provide such access without the removal of the locking disc.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 2 is a cross sectional view of the embodiment shown in Fig. 1.

Fig. 3 is a perspective view of an attachment bracket for the locking disc.

Figure 4:
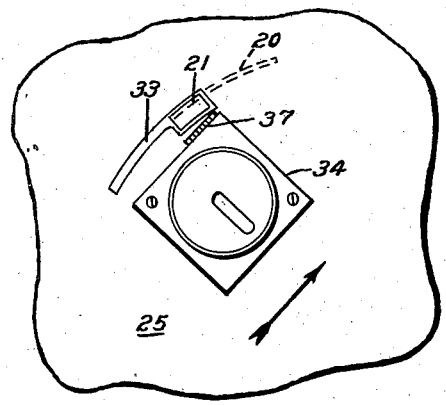
Figure 5:
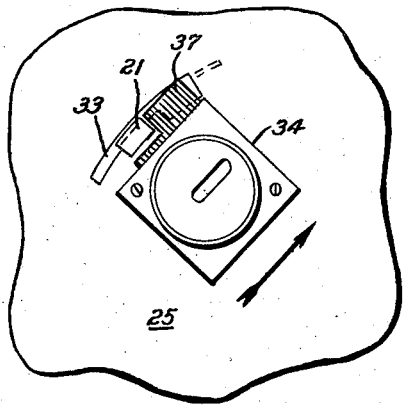
Figure 6:
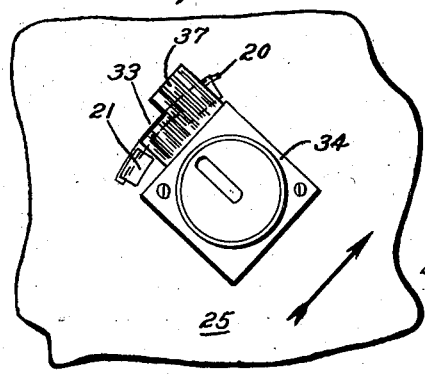

Figs. 4, 5, and 6 are detail views of the lock in three positions of adjustment.

Fig. 7 is a cross sectional view of a second embodiment of the invention.

Figure 8:
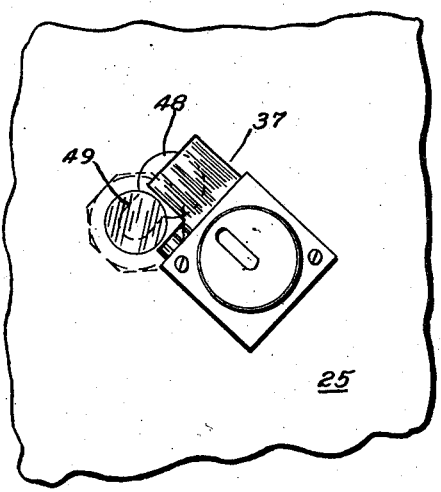

Fig. 8 is a detailed view of the locking arrangement shown in Fig. 7.

Figure 9:
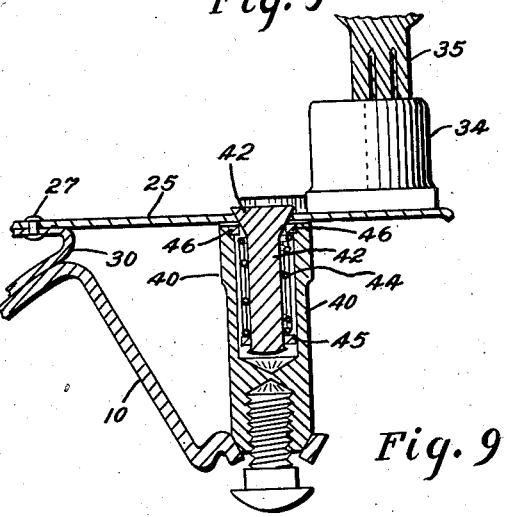

Fig. 9 is a cross sectional view of the mounting arrangement for the embodiment shown in Fig. 7, and Fig. 10 is a cross sectional view of a modification of the embodiment shown in Fig. 7.

Figure 1:
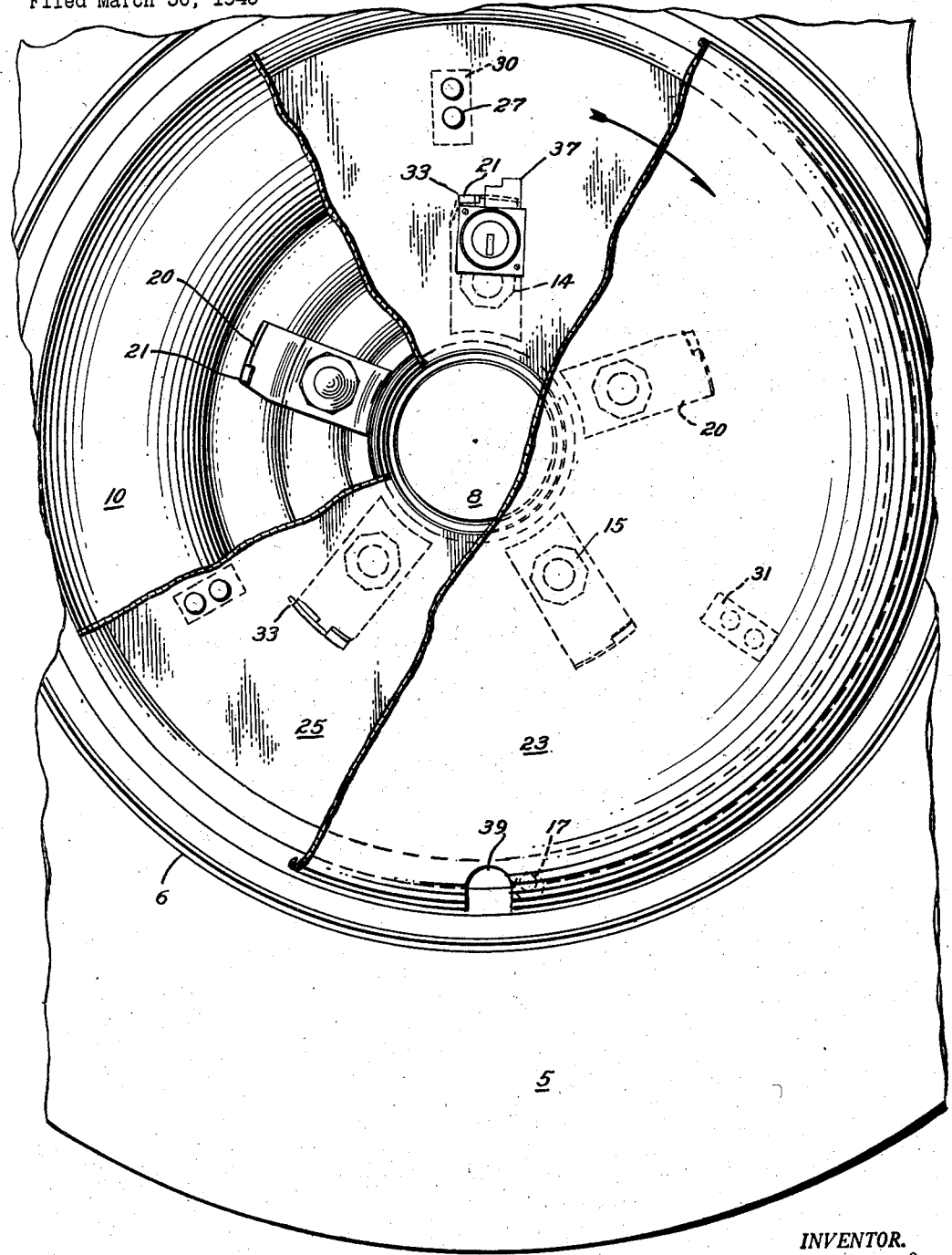
Fig. 1 is a front elevational view showing one embodiment of the invention.

Referring now to the drawings, and particularly to Figs. 1 to 6, inclusive, in which like elements are identified by the same numerals, a section 5 of a tire is shown surrounding the rim 6 of an automobile wheel. The automobile wheel consists of an axle 8, a cylindrical hub member 9, and a wheel disc 10 to which the rim 6 is attached. The wheel disc 10 is fastened to the hub 9 by means of bolts, such as shown at 12 and 13, on which the usual nuts, such as shown at 14 and 15, respectively, are threaded. An air valve or stem 17 for the inner tube 18 is shown extending through the rim 6. As shown in Fig. 1, five bolts are provided for attaching the wheel to the hub and behind each bolt is inserted a bracket or lug member 20 shown in perspective in Fig. 3. This member has a configuration to conform to the contour of the wheel disc 10, the outer end portion being parallel to the axle of the wheel. The bases of the lugs have holes therein through which the wheel bolts pass, while the outer ends have bent over tips 21 extending over approximately one-third of the end portions thereof.

A wheel disc or hubcap 23, which may have a decorative design embossed or otherwise placed on the surface thereof in any other suitable manner, is shown of a size to span nearly the entire outer diameter of the rim 6 so as to cover not only the wheel bolt nuts, as shown at 14 and 15, but also the valve stem 17. Welded or otherwise fastened adjacent the outer rim of the inner surface of the disc 23 is a flat plate 25 having an opening 26 therein to accommodate the axle 8 and having mounted thereon, by welding or rivets such as shown at 27, V-shaped spring members 30 and 31. These V-shaped members may be several in number disposed equi-distantly around the plate 25, or they may constitute a single integral member. These members provide tension between the plate 25 or disc 23 and the wheel disc 10, so as to prevent any rattling of the disc 23 or plate 25 during the running of the vehicle.

The plate 25 is provided with a series of slots corresponding to the number of fastening members 20, as shown in Figs. 4, 5, and 6 at 33. These slots are stepped so as to have two widths, a narrow section on the left-hand side, and a wider section on the right-hand side, the narrow section being approximately twice as long as the wider section. To attach the plate 25 to the brackets 20, the bent over tips 21 are inserted in the wide sections of the slots 33 and then the disc 23 is rotated in the direction of the arrows so that the portions of the brackets just back of the tips 21 enter the narrow sections of the slots 33 and the tips 21 overhang the plate 25. It will be noted that the ends of brackets 20 are wider than the slots 33, as shown in Fig. 6, to prevent the entire ends of the brackets from entering the slots. To lock the plate 25 and disc 23 in this position, a lock 34 is provided on the plate with a key 35 which may be inserted in the lock through an opening in the disc 23. Only one such lock is necessary. This lock is provided with a notched or stepped latch or bolt 37, which, when the plate 25 is rotated as far as possible so that the members 21 are in their extreme left-hand positions (see Fig. 6), the widest portion of the bolt extends across the slot 33. This, of course, prevents the plate 25 from being rotated in the opposite direction of the arrows and thereby prevents removal of the disc 23.

When the disc 23 is in locked position, a notch or hole 39 in the rim of the disc 23 is to one side of the air valve 17 to prevent access to the valve. (See Fig. 1.) Thus, when the disc 23 is locked on the wheel, not only are the wheel nuts inaccessible for the removal of the wheel, but also the air valve 17 can not be reached so that the tire may be deflated and thereby removed from the rim 6. However, when it is desired to inflate the tire or make the valve 17 accessible, the key 35 is inserted in the lock and rotated one quarter turn, as shown by the key slot in Fig. 5. This draws the lock latch 37 halfway within the lock 34, as shown in Fig. 5, which will permit the plate 25 to be partially rotated toward its unlocked position a distance sufficient to expose the valve 17 through the notch 39, while, at the same time maintaining the tips 21 of the member 20 in locked contact with the plate 25. Thus, the disc 23 remains in position on the wheel during the checking or inflation of the tire 5. To again lock the disc in position, it is only necessary to again rotate it to the right so that the bolt 37 may be extended to its locking position. To completely remove the disc, the key 35 is turned a one-half revolution, thus withdrawing the stepped bolt 37 entirely within the lock 34 so that the tips 21 may be withdrawn through the wide portions of the slots 33. (See Fig. 4.)

Referring now to Figs. 7, 8, and 9, a wheel construction similar to that shown in Fig. 2 is illustrated, and also a similar hub protective disc construction. However, the means for mounting the locking disc to the wheel are, instead of the nuts 14 and 15 and bracket 20 of Fig. 2, special nut extensions, which take the place of the usual nuts 14 and 15 and simultaneously act as fastening members for the locking disc 23. As shown clearly in Fig. 9, the extension nuts 40 are threaded on the stud bolts 12 and 13 in the same manner as the nuts 14 and 15, but these extensions have upper hollow portions in which are mushroom headed plungers or stems 42 which are urged into the hollow portions of the extensions 40 by the tension of coil springs 44, surrounding the plungers 42. The springs have one end bearing on washers 45 at the inner ends of the plungers 42 and their other ends bear on washers 46, which are attached to the outer rims of the extensions 40 by welding, peening, or other suitable means. The plungers 42, therefore, are removable outwardly against the tension of the springs 44.

The plate 25 of the disc 23 is now provided with a series of elongated holes instead of notches as shown in Figs. 4 and 5, one of these holes being shown in Fig. 8, with a large section 48 and a smaller section 49. To attach the plate 25 to the extensions 40, the plate is slipped over the mushroom heads of the plungers 42 through the large section 48 of the holes and then rotated, as in the first modification described above. This action raises the plungers 42 so that the narrower portions of the plungers may enter the narrow sections 49 of the holes in the plate 25. When this position is reached, the key 35 is turned so that the lock bolt 37 is inserted behind the head of one of the stems 42 to prevent rotation of the plate 25 and disc 23.

Referring now to Fig. 10, this modification is similar to that shown in Fig. 7, except, instead of the plate 25 which supports the disc 23, a smaller diameter plate 52 is attached by screws, such as 49', to a series of studs 53, one of which may include a lock, such as shown at 54. These studs may be an integral part of a die-cast or molded disc 23 or separate members welded or otherwise fastened thereto. The plate 52 has holes therein similar to that shown at 48—49 in Fig. 8, whereby the plate 52 may be attached under the mushroom heads of the stems 42 in the same manner as that shown in Fig. 7. The plungers are locked in position in the holes in the plate 52 in the same manner as that shown in Fig. 8. Although an extending bolt lock is illustrated, a rotary latch could be used with either type of attachment to prevent the rotation of the discs.

From the above, it will be noted that the locking device is rattle proof inasmuch as not only are the plates 25 and 52 under the spring tension of the plungers 42, but in the modifications shown in Figs. 2 and 7, spring members 30 and 31 are provided for maintaining the outer rim of the disc under a strong tension. It also will be noted that the locking device may be readily attached to any automobile wheel by simply removing the nuts of the wheel bolts and either inserting over the bolts the fastening brackets 20 or using the special bolt extensions shown in Fig. 9. The locking device not only prevents access to the wheel bolts which prevents unauthorized removal of the wheel, but also prevents access to the valve stem to prevent deflation of the tire and its removal. It is also unnecessary to remove the locking disc to permit deflation of the tire, since the locking device will permit a limited rotation of the disc to make the valve stem accessible. The decorative disc may have a supporting plate welded or bolted directly thereto, as shown at 25 in Figs. 2 and 7, or the disc may have lugs or bosses integrally cast therewith, or otherwise attached to it to which the supporting plate is fastened as shown in Fig. 10. The locking devices described above are also applicable to other types of wheels and rim shapes, while decorative discs of various forms may be used, the scope of the invention being defined by the appended claims.

I claim as my invention:

1. A locking hubcap for a vehicle wheel comprising a hubcap of a size to enclose the wheel bolts and valve stem of an automobile wheel, an inner supporting plate for said hubcap, a plurality of fastening members extending outwardly from said wheel bolts, said plate having a corresponding plurality of openings therein for providing entrance of the ends of said fastening members through said plate in one position of said hubcap with respect to said fastening members, each of said openings having a narrower width to prevent withdrawal of the ends of said fastening members from said plate in other positions of said hubcap with respect to said fastening members, and means to control the positioning of said hubcap with respect to said fastening members, said last mentioned means including a lock having a stepped bolt for maintaining said hubcap in said other positions to prevent withdrawal of the ends of said members from said plate, and to permit a predetermined amount of rotation of said plate with respect to said members to expose said valve stem through said hubcap.

2. A locking hubcap for a vehicle wheel comprising a hubcap of a size to cover the wheel bolts and valve stem of said vehicle wheel, an inner plate member attached to said hubcap, said plate member having a plurality of apertures therein, each of which varies in size, and a plurality of fastening members for holding said wheel to the wheel hub of said vehicle, said fastening members being adapted to pass through said apertures at one rotational position of said hubcap with respect to said fastening means and said fastening members not being withdrawable through said apertures in a plurality of other rotational positions of said hubcap with respect to said fastening members, and means attached to said plate member and adapted to contact said fastening members to control the rotational positioning of said hubcap with respect to said fastening members, said last mentioned means including a lock having a stepped bolt for preventing the rotation of said hubcap with respect to said fastening members when in locked position.

3. A locking hubcap for an automobile wheel comprising a hubcap of a size sufficient to cover the wheel bolts and valve stem of said automobile wheel, extensions mounted on the wheel bolts and extending outwardly therefrom, an inner plate for said hubcap, said hubcap having a plurality of variable width openings to accommodate said extensions, and locking means having a variable stepped bolt for providing three different rotational positions of said hubcap with respect to said extensions.

4. A locking hubcap in accordance with claim 3, in which one of said rotational positions is provided when one of said extensions contacts one step of said bolt which prevents access to the wheel bolts and valve stem of said wheel, another rotational position is provided when said extension contacts another step of said bolt which prevents access to said wheel bolts and provides access to said valve stem, and a third rotational position is provided when said bolt is withdrawn from contact with said extension which provides access to said wheel bolts and said valve stem.

5. A locking device for the wheel and tire of an automobile comprising a plurality of extensions adapted to be attached to the hub bolts of the wheel of an automobile, said extensions having bent over ends, a curved disc of sufficient size to cover said extensions and the valve stem of said wheel, a plate extending across the inner surface of said disc and attached thereto, a plurality of slots in said plate having different width sections, one section of said slots permitting entrance of said bent over ends through said plate and another section of said slots preventing the withdrawal of said bent over ends through said slots, and resilient members interposed between said wheel and said plate when said extensions are attached to said plate.

6. A locking device in accordance with claim 5, in which a lock is provided for preventing movement of said bent over ends to said first mentioned width sections of said slots when said extensions are in said second mentioned width sections.

7. A locking device in accordance with claim 5, in which access to said hub bolts and valve stem is prevented when said disc is locked to said extensions, and a lock having a stepped bolt is provided, one setting of said lock placing one width of said stepped bolt across one of said slots to permit said disc to be rotated to a position to provide access to said valve stem without permitting said bent over ends to be removed from said plate.

8. A locking device for a vehicle hubcap comprising a disc adapted to cover the wheel bolts and valve stem of a pneumatic wheel, means for adjusting said disc to said wheel in two positions, one of said positions preventing access to said wheel bolts and valve stem and another position of said disc preventing access to said wheel bolts, but providing access to said valve stem, and means for controlling the position to which said disc may be adjusted.

9. A locking device for preventing the unauthorized removal of a vehicle wheel and tire comprising a plurality of extensions mounted on the bolts for attaching the wheel of said vehicle to said vehicle, a cover for preventing access to said extensions and to the valve stem of said vehicle wheel when said cover is mounted on said extensions, said cover having a portion with a plurality of elongated apertures therein for permitting the rotation of said cover to a plurality of positions on said extensions, one position of said cover on said extensions exposing only said valve stem, and another position of said cover on said extensions exposing said bolts and said valve stem.

10. A locking device for preventing the unauthorized removal of a vehicle wheel and tire comprising a plurality of extensions mounted on the bolts for attaching the wheel of said vehicle to said vehicle, a cover for preventing access to said extensions and to the valve stem of said vehicle wheel when said cover is mounted on said extensions, said cover having a portion with a plurality of elongated apertures therein for permitting the rotation of said cover to a plurality of positions on said extensions, one position of said cover on said extensions exposing only said valve stem, and spring means for tensioning said cover on said wheel to prevent the rattling thereof during rotation of said wheel, said extensions being brackets mounted on said wheel bolts and having bent over ends for insertion through portions of said apertures.

11. A locking device for preventing the unauthorized removal of a vehicle wheel and tire comprising a plurality of fastening members mounted on the hub of the wheel of said vehicle, a cover adapted to prevent access to said fastening members and to the valve stem of said wheel when said cover is mounted in one rotational position with respect to said fastening members, and to prevent access to said fastening members but access to said valve stem when in another rotational position thereof with respect to said fastening members, and means connected to said cover for attaching said cover to said fastening members to permit said different rotational positions thereof with respect to said fastening members.

GEORGE H. DUVALL, Jr.

REFERENCES CITED

The following references are of record in the file of this patent:

UNITED STATES PATENTS

| Number | Name | Date |
|---|---|---|
| 1,353,511 | Baumgartl | Sept. 21, 1920 |
| 2,305,110 | Schatzman | Dec. 15, 1942 |
| 2,319,931 | Jandus | May 25, 1943 |
| 2,329,945 | Schatzman | Sept. 21, 1943 |
| 2,334,828 | Mallory | Nov. 23, 1943 |